United States Patent
May-Weymann et al.

(10) Patent No.: US 8,879,699 B1
(45) Date of Patent: Nov. 4, 2014

(54) COMMUNICATION SYSTEM AND METHOD

(71) Applicant: Nvidia Corporation, Santa Clara, CA (US)

(72) Inventors: Alexander May-Weymann, Sophia Antipolis (FR); Nicolas Magnan, Sophia Antipolis (FR); Flavien Delorme, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/023,008

(22) Filed: Sep. 10, 2013

(51) Int. Cl.
*H04M 11/00* (2006.01)
*H04W 52/02* (2009.01)
*H04W 4/14* (2009.01)

(52) U.S. Cl.
CPC ............ *H04W 52/0229* (2013.01); *H04W 4/14* (2013.01)
USPC ...... 379/93.28; 455/574; 455/557; 379/93.05

(58) Field of Classification Search
USPC .............. 379/93.05, 93.28; 455/574; 375/222
See application file for complete search history.

(56) References Cited

U.S. PATENT DOCUMENTS

2011/0007679 A1* 1/2011 Tsai ............................... 370/311
2013/0116008 A1* 5/2013 Delorme et al. .............. 455/557

OTHER PUBLICATIONS

"3rd Generation Partnership Project; Technical Specification Group Core Network and Terminals; Use of Data Terminal Equipment—Data Circuit Terminating Equipment (DTE-DCE) Interface for Short Message Service (SMS) and Cell Broadcast Service (CBS) (Release 11)," 3GPP TS 27.005, V11.0.0, Dec. 2011, 68 pages.

* cited by examiner

*Primary Examiner* — Stella Woo

(57) ABSTRACT

The application relates to a modem for use at a terminal. In one embodiment, the modem includes: (1) a first interface arranged for connection to a network; (2) a second interface arranged for connection to a host processor on the terminal; and (3) a processing unit arranged to, on receipt of a message from the network addressed to the host processor: determine whether or not the host processor is in a power saving mode; and if it is determined that the host processor is in a power saving mode, cause the first interface to transmit an acknowledgement to the message to the network regardless of whether a communication from the host processor is received via the second interface.

21 Claims, 2 Drawing Sheets

COMMUNICATION SYSTEM AND METHOD

TECHNICAL FIELD

The disclosure relates to a modem for use at a terminal. In particular, the disclosure relates to acknowledging a message received from a network.

BACKGROUND

In known communication systems, a modem is used at a terminal to connect the terminal to a public land mobile network (PLMN) such as a mobile cellular network (i.e. a 3GPP network or other CDMA network). The terminal may comprise a "host" or "application" processor that controls or performs processing functions on or for messages received from the network for the terminal.

To assist the application processor in receiving messages from the PLMN, the modem can receive a message addressed to the application processor from the PLMN. The message may be a short message service (SMS) message. The first part of reception is done by the modem. Following reception of the message, the modem indicates the content of the received message to the application processor. The application processor then reacts to the indication (such as by storing the SMS or indicating it to a user of the terminal). The application processor sends a response to this indication back to the modem. The response provides information on whether or not the SMS has been correctly processed by the application processor. If the SMS was correctly processed, the modem indicates such to the network using an acknowledgement. When the network receives such an acknowledgment from the modem, the network will not retransmit the message.

The above described process can be implemented using protocols provided by the 3GPP specifications. In particular, the modem may indicate the content of an SMS message to the application processor using an attention (AT) command port by asserting "+CMT: . . . " (see TS27.005—chapter 3.4.1). After the modem has received this indication and reacted to it, the modem can respond to the modem by indicating that the SMS was correctly processed by asserting "AT+CNMA" on the AT command port (as described in 3GPP TS27.005—chapter 3.4.4). On reception of the AT+CNMA message, the modem confirms receipt of the received message to the network.

In parallel to indicating the message to the application processor (using, e.g. the +CMT indication), the modem starts a timer. The timer has a time interval $t_i$ associated with it. The time interval $t_i$ is a maximum time in which the modem expects to receive a response from the application processor to the indication. If a response is not received in time interval $t_i$ the modem is configured to respond to the network by indicating a negative result to the received message. The network may then re-transmit the message. Whether or not the network re-transmits the message is determined on a plurality of different factors. For example, the negative result may instruct the network to not transmit any further messages to the application processor.

Once the time interval $t_i$ has expired (without receipt of response from the application processor to the indication) the modem is arranged to stop indicating to the application processor that a message has been received e.g. the +CMT indication on the AT-port stops being asserted. If the response to the indication from the application processor arrives at the modem after expiry of the time interval $t_i$ the modem will handle that response as though the response is an erroneous transmission. For example, in 3GPP, on receipt of the AT+CNMA command being received at the modem from the application processor, the modem responds to the AT+CNMA command by responding ERROR to the application processor. This process is described in 3GPP TS27.005—chapter 3.4.4.

SUMMARY

According to a first aspect of the disclosure, there is provided a modem for use at a terminal. In one embodiment, the modem includes: (1) a first interface arranged for connection to a network; (2) a second interface arranged for connection to a host processor on the terminal; and (3) a processing unit arranged to, on receipt of a message from the network addressed to the host processor: determine whether or not the host processor is in a power saving mode; and if it is determined that the host processor is in a power saving mode, cause the first interface to transmit an acknowledgement to the message to the network regardless of whether a communication from the host processor is received via the second interface.

According to another aspect of the disclosure, there is provided a computer program product for operating a modem for use at a terminal, the modem having a processing unit, a first interface arranged to connect to a network, a second interface arranged to connect to a host processor on the terminal. In one embodiment, the computer program product includes code embodied on a non-transitory computer-readable medium and configured so as when executed on the processing unit of the modem to: (1) on receipt of a message from the network addressed to the host processor: determine whether or not the host processor is in a power saving mode; and (2) if it is determined that the host processor is in a power saving mode, cause the first interface to transmit an acknowledgement to the message to the network regardless of whether a communication from the host processor is received via the second interface.

According to another aspect of the disclosure, there is provided a method of operating a modem at a terminal, the modem having a processing unit, a first interface arranged to connect to a network, a second interface arranged to connect to a host processor on the terminal. In one embodiment, the method includes: receiving a message addressed to the host processor on the first interface from the network; determining whether or not the host processor is in a power saving mode; and if it is determined that the host processor is in a power saving mode, cause the first interface to transmit an acknowledgement to the message to the network regardless of whether a communication from the host processor is received via the second interface.

BRIEF DESCRIPTION OF THE DRAWINGS

For a better understanding of the disclosure and to show how it may be put into effect, reference by way of example is made to the accompanying drawings in which.

DETAILED DESCRIPTION

For computer systems implemented on user terminals, such as mobile smart phones and tablets, it is important to keep the power consumption of the computer system at a low level because, for example, the power supply to the user terminal may be limited. One mechanism to conserve power supply levels is for the application processor on the user terminal to operate in a power saving ("sleep") mode. While in the power saving (or sleep) mode the processor is unable to process information, but typically draws a fraction of the electrical current it draws while operating in an active (or awake) mode, where it does process information. Thus the application processor consumes less power when in the sleep mode.

The disclosure recognizes that if the application processor is in a power saving mode, there may be a good reason for the response to the indication (e.g. the AT+CNMA command) being received late i.e. after expiry of the timer. In this situation, it would be advantageous for the modem to make the message available to the application processor following expiry of the timer.

Figure 1A:
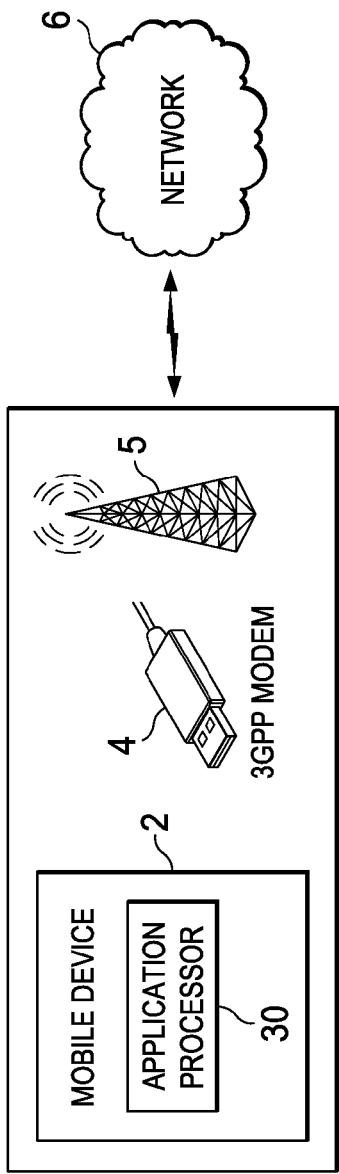
FIGS. 1a and 1b are schematic block diagrams of communication systems comprising a host terminal and a modem.
Figure 1B:
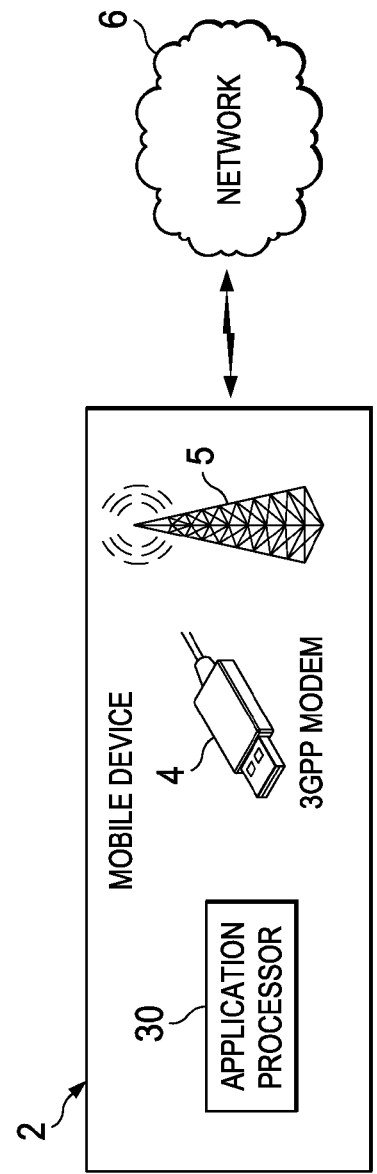

Reference is first made to FIG. 1a and FIG. 1b which illustrate schematic block diagrams of communication systems comprising a host terminal 2 and a modem 4. The host terminal 2 may be a user terminal, and may for example take the form of a laptop computer, tablet style computer, personal digital assistant (PDA) or mobile phone (which may be referred to as a "smart phone"). As shown in FIG. 1a, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 1a, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2). In another alternative set up, as shown in FIG. 1b, the modem 4 may be internal to the host terminal 2, e.g. taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection. The system could also be a single-chip design where the modem 4 and application processor 30 share the same die.

The system also comprises a PLMN 6 such as a mobile cellular network (i.e. 3GPP network or other CDMA network). Elements of the network 6 are well known to those skilled in the art and are not discussed herein.

For connection to the network 6, the modem 4 comprises a first interface.

With reference to the communication system shown in FIG. 1a, the first interface may comprise a wireless transceiver, typically in the form of a radio frequency (RF) transceiver and an antenna 5. The first interface of the modem 4 connects via an antenna (not shown) of the mobile cellular network 6 enabling the modem 4 to establish a channel between itself and the mobile cellular network 6.

With reference to the communication system shown in FIG. 1b, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via an antenna (not shown) of the mobile cellular network 6 enabling the modem 4 to establish a channel between itself and the mobile cellular network 6.

This channel referred to above may be referred to as a "context". For example, if the mobile cellular network is a 3GPP network, then the connection between the modem 4 and a 3GPP network 6 may be called a PDP (Packet Data Protocol) context in 2G or 3G terminology, and an EPS (Evolved Packet System) bearer context in LTE (Long Term Evolution standards) terminology. The physical medium of the connection is typically a radio channel such as a 2G, 3G or LTE radio channel and the protocol that drives it may comprise a set of protocol layers as defined for example by 3GPP standard specifications. The mobile cellular network 6 may be coupled to a further, packet-based network, e.g., a wide area internetwork such as the Internet, by way of one or more gateway routers.

For connecting to the host processor 30 on the host terminal 2, the modem 4 comprises a second interface.

With reference to the communication system shown in FIG. 1a, the second interface, between the host processor 30 and modem 4, could for example comprise a wired connection such as a serial interface, for example a Universal Serial Bus (USB), or a short-range wireless transceiver such as an infrared connection or a radio frequency connection (e.g. Bluetooth).

With reference to the communication system shown in FIG. 1b, the second interface, between the host processor 30 and modem 4, could for example comprise a wired connection within the host terminal 2. The second interface may be an interface to a shared memory on the host terminal 2. That is, the host processor 30 and modem may communicate with each other through this shared memory.

Figure 2:
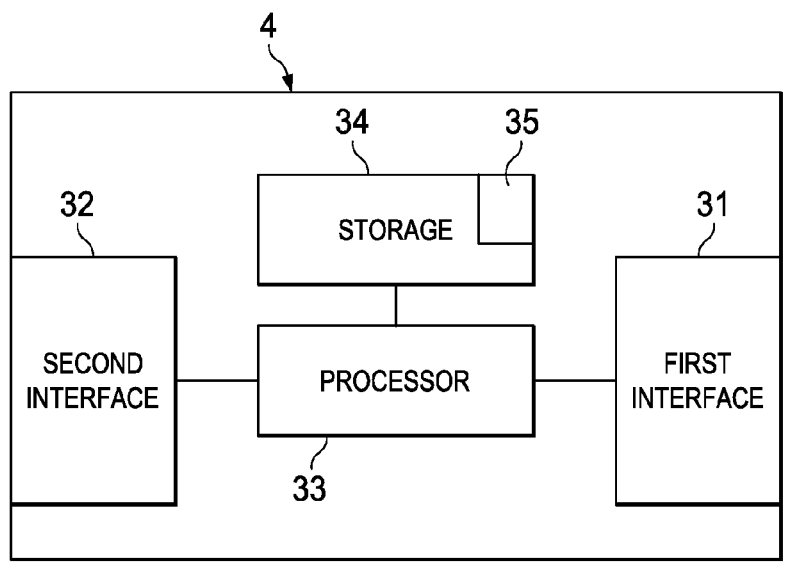
FIG. 2 is a schematic block diagram of a modem for use at a host terminal.

Referring to FIG. 2, the modem 4 may comprise a processor 33 and, operatively coupled to the processor 33, a non-transitory computer-readable storage medium 34 such as a magnetic or electronic memory storing soft-modem code 35. The code 35 on the storage medium 34 is arranged to be executed on the processor 33, so as when executed to send and receive packets between the host 2 and network 6, and to perform the additional operations of the modem 4 as discussed below. However, the possibility of some or all of the modem functionality being implemented in dedicated hardware is not excluded. The modem 4 may be configured in a similar manner to that discussed in relation to FIG. 1 above, but with additional functionality added in accordance with the disclosure, an example of which will be discussed in more detail below.

The modem 4 is arranged to receive messages on a first interface 31 from a network. The messages may be for an application processor 30. The modem may determine whether or not a particular message is for the application processor 30 by examining an address field of that message. On determining that a particular received message is for the application processor, the modem may indicate to the application processor that a message has been received for the application processor. The modem is arranged to carry out communications with the application processor using a second interface 32. To reduce retransmissions by the network of this message, the modem is arranged to determine whether or not the application processor is in a power saving mode and to, if it is determined that the application processor is in a power saving mode, cause the modem to transmit an acknowledgement to the message via the first interface to the network. The network is arranged such that receipt of the acknowledgement does not cause the message to be retransmitted to the modem following receipt of such an acknowledgement. The acknowledgement is transmitted regardless of whether or not a communication from the application processor is received via the second interface.

The modem 4 determines whether or not the application processor is in a power saving mode using "events" received from the application processor 30 via the second interface 32. When the device 2 is first powered on, the application processor 30 is in an active mode and the application processor 30 transmits an event to the modem 4 indicating that the application processor 30 is in the active mode. The modem 4 may receive an event from the application processor 30 which indicates that the application processor 30 is entering a power saving mode from the active mode. The modem 4 may also receive an event from the application processor 30 which indicates that the application processor 30 has entered the active mode from the power saving mode. When the modem 4 receives an event from the application processor it is arranged to update a parameter "latest event" held by the modem in memory 34 which indicates whether the application processor 30 is in the active mode or in the power saving mode. These events are received by the modem 4 via the second interface 32 in the form of an AT (ATtention) command.

Figure 3:
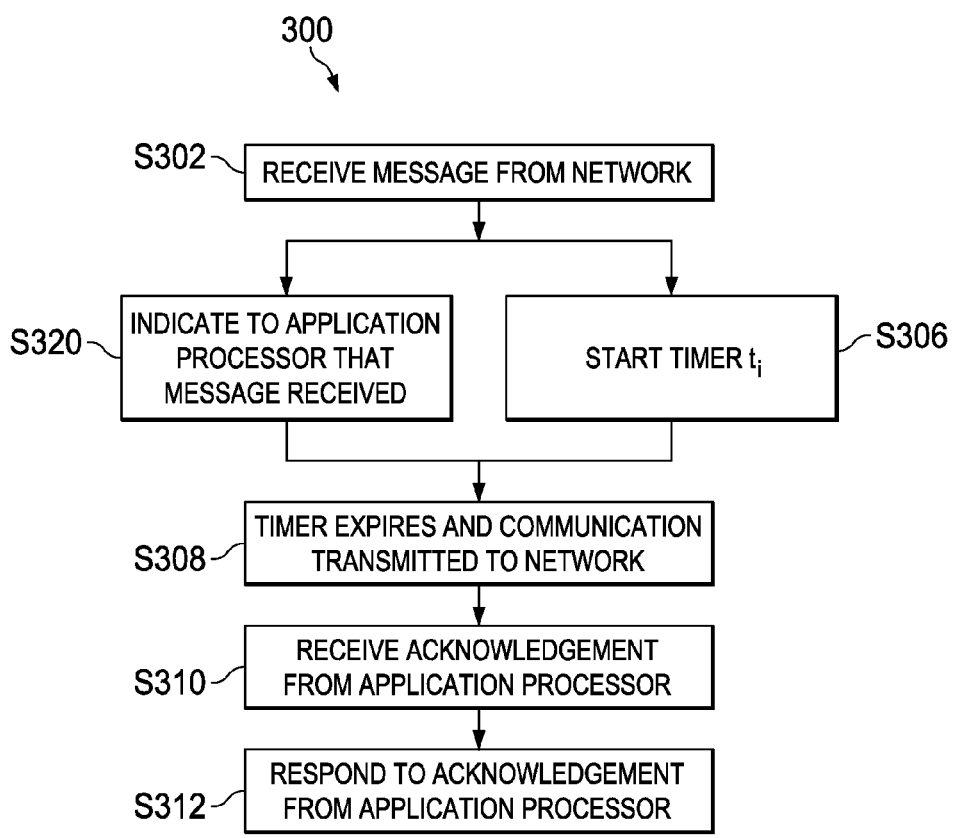
FIG. 3 is a flow chart of a process performed by a modem.

An embodiment of the disclosure is provided by way of example with reference to FIG. 3. FIG. 3 is flow chart of a process 300 for acknowledging a message received from a network.

When the process 300 is initiated the application processor 30 may be in an active mode or in a power saving mode. Thus, when the process 300 is initiated the parameter "latest event" held by the modem in memory 34 may indicate that the application processor 30 is the active mode or in the power saving mode. Although in this embodiment the modem comprises memory 34 (as shown in FIG. 2), the memory 34 may be remote from the modem, provided that the modem is able to access the memory within an appropriate time. The appropriate time is implementation dependent. Advantageously the appropriate time is no more than the time interval $t_i$ of the timer (described in further detail below).

At step S302, the modem receives a message from the network, via the first interface, for the application processor.

At step S304, the modem is arranged to indicate to the application processor that a message for the application processor has been received from the network. For a 3GPP network, this can be indicated to the application processor using the AT-command port using e.g. "+CMT: ...".

Following receipt of the indication from the modem, the application processor reacts to the indication, such as by storing the received message. After reacting to the indication, or otherwise performing some processing function on the received message, the application processor indicates to the modem that the received message has been processed correctly by the application processor. For example, in 3GPP systems, this can be provided by the application processor asserting an AT+CNMA message to the modem on the AT command port. The AT+CNMA message acknowledges receipt, by the application processor, of the indication provided by the modem.

In parallel to indicating the message to the terminal (using, e.g. the +CMT indication), the modem starts a timer in step S306. As mentioned above, the timer has a time interval $t_i$ associated with it. Time interval $t_i$ is a maximum time in which a response from the terminal to the indication should be received by the modem. The length of the time interval may be set by, or in dependence on, a communication protocol according to which the modem is communicating with the network.

At step S308, the timer expires and the modem transmits a communication to the network. The type of communication transmitted by the modem to the network is dependent on a determination of whether or not the application processor is in a power saving mode. The determination is performed by the modem and can be performed either prior to or following expiry of the timing interval $t_i$. Embodiments regarding when the determination may be performed are outlined below.

The determination is made by referring to the "latest event" held by the modem in memory 34.

If the modem determines that the application processor is in a power saving mode, the communication is an acknowledgement regardless of whether or not a response to the indication is received from the application processor prior to expiry of the timing interval $t_i$. The acknowledgement indicates to the network that the message does not need to be retransmitted. The modem and the application processor will consume less power to receive a message if a message is transmitted only once instead of when the message is retransmitted (as additional processing associated with retransmitted messages is not performed). Therefore the network is advantageously arranged so that the message is not retransmitted on receipt of the acknowledgement.

If the modem determines that the application is not in a power saving mode, the communication may be either an acknowledgment or a request for retransmission of the message. The modem has access to a list of acceptable criteria for not receiving a response from the application processor to the indication prior to expiry of the time limit. An acceptable criterion is that the application processor is in a power saving mode. Another acceptable criterion is that the AT command port is currently blocked e.g. by an AT+CMGS command being asserted on the AT command port, which indicates that the user is entering a message. If it is determined that the application is not in a power saving mode, the modem is configured to determine whether at least one of the other acceptable criterion is fulfilled. If it is determined that at least one of the other acceptable criterion is fulfilled, the communication is an acknowledgment. If it is determined that none of the acceptable criterion are fulfilled, the communication is a request for retransmission of the message. The request for retransmission may be in the form of a negative acknowledgment.

At step S310, the modem receives an acknowledgement from the application processor indicating that the message received from the network for the application processor has been processed correctly by the application processor. Where 3GPP protocols are employed, this acknowledgement from the application processor may be in the form of an AT+CNMA command. The application processor may also pass at least one result code to the modem in step S310. The result code relates to how the received message was handled by the application processor. The result codes are defined by a specification relating to a communication protocol and can indicate both how the application processor attempted to react to or otherwise process the message received from the network and the degree of success of this attempted processing.

At step S312, the modem responds to the acknowledgement from the application processor by sending acknowledgements for each received result code. The modem does not respond with an error message to the received acknowledgement from the application processor.

Embodiments of the disclosure are applicable to any apparatus comprising an application processor and a modem entity that communicate with each other. For example, the application processor and modem entity may communicate with each other via a serial interface connection or shared memory.

It will be appreciated that the above embodiments have been described only by way of example, and other variants or applications may be apparent to a person skilled in the art given the disclosure herein.

For instance, while embodiments above have been described in relation to certain standards such as 3GPP networks and so forth, these are not intended to be limiting and the disclosure may in fact be applied within any communication standard of any mobile cellular network, or of any packet-based network if such a network is involved. Nor do the terms "context" or "channel" imply a specific nature or standard, but can be used to refer to any kind of suitable data conduit or session established between a modem and a network.

Further, the embodiments described above mention that the determination of whether the application processor is in a power saving mode or not may be made by the modem either prior to or following the expiry of the timer interval $t_i$. Following the expiry of the timer interval includes a determination made on expiry of the timing interval $t_i$ and any time thereafter. In one embodiment, the determination is made on receipt of the message addressed to the application processor from the network. In an alternative embodiment, the determination is made on expiry of the timing interval $t_i$. The alternative embodiment advantageously results in the modem only ever performing the determination when it is necessary, which conserves power at the modem. It is also advantageous for the modem to wait as long as possible (given the timing constraints of the protocol in acknowledging or negatively acknowledging the message received from the network) before determining whether or not the application processor is in a power saving mode. A longer wait increases the amount of information available to the modem regarding the state of the application processor. This information can be used when making the determination. Consequently, the longer the modem waits to make the determination, the lower the likelihood of the modem incorrectly determining that the application processor is in a power saving mode. In one embodiment, the latest the modem can wait to make the determination is until expiry of the timer i.e. the modem makes the determination on expiry of the timer interval $t_i$.

The list of acceptable criteria is stored in memory in a contiguous or distributed manner. The modem has access to the memory to have access to the list. The memory may be local or remote. In either case, the memory and the modem are advantageously arranged such that the modem can access the criteria and perform a determination of whether or not an application processor fulfils at least one of the criteria in a time no greater than the timing interval $t_i$. The modem may be arranged to start accessing the criteria and performing respective determinations as soon as the timer starts. Alternatively, the modem may be arranged to only start accessing the criteria and performing respective determinations when the timer expires. The modem may be arranged to determine only whether or not a single criterion of the list is fulfilled by the processing unit. Alternatively, the modem may be arranged to determine whether criteria of the list are fulfilled by the processing unit. The modem may be arranged to access all of the criteria in the list and perform respective determinations. The modem may be arranged to access only a subset of the criteria in the list and perform respective determinations. In one embodiment, the modem is arranged to stop performing determinations of whether criteria in the list are fulfilled as soon as it is determined that a single criterion is fulfilled. This is because it will use more processing power to continue to perform such determinations and further determinations are unnecessary for deciding how to respond to the received message.

Advantageously, the modem is configured to buffer the message received from the network for the application processor in the event the application processor is unable to correctly process the received message. In this embodiment, the modem re-issues the received message indication from step S304 to the application processor. The modem determines whether or not the received message indication from step S304 should be reasserted using the result code provided by the application processor to the modem in step S310. This embodiment advantageously provides that a message is not lost due to a processing error made by the application processor during initial processing steps.

Whilst embodiments have been described above with reference to two operating modes of the application processor 30, principles of the disclosure may extend to cases where the application processor 30 may operate in more than two modes associated with varying degrees of power consumption and the modem may operate to optimize the PLMN search intervals accordingly.

Whilst embodiments have been described above with reference to the application processor reacting by storing the message, the application processor may react in alternative ways. For example, a possible reaction is to indicate the received message to a user. Another possible reaction is to transition from a power saving mode to an active mode. Another possible reaction is to simply acknowledge, to the modem, receipt of the indication received from the modem.

Whilst embodiments have been described above with reference to storing the parameter "latest event" held by the modem in memory 34, it will be appreciated that this parameter may not necessarily be stored on the same physical memory device as the rest of the soft modem code.

Whilst embodiments have been described above with reference to determining whether or not the application is in a power saving mode using the parameter "latest event" held by the modem in memory 34, it will be appreciated that the determination could be made in other ways, such as by querying the application processor. However, as the application processor is unlikely to be able to respond to status enquiries from the modem in an adequate time period if the application processor is in a power saving mode. As such, in some embodiments a stored status list is used for determining whether or not the application processor is in a power saving mode instead of sending new queries to the application processor.

As noted previously, the disclosure recognizes that if the application processor is in a power saving mode, there may be a good reason for the response to the indication (e.g. the AT+CNMA command) being received late i.e. after expiry of the timer. In this situation, it would be advantageous for the modem to make the message available to the application processor following expiry of the timer.

Accordingly, the disclosure provides a modem, for use at a terminal, that includes: a first interface arranged for connection to a network; a second interface arranged for connection to a host processor on the terminal; and a processing unit arranged to, on receipt of a message from the network addressed to the host processor: determine whether or not the host processor is in a power saving mode; and if it is determined that the host processor is in a power saving mode, cause the first interface to transmit an acknowledgement to the message to the network regardless of whether a communication from the host processor is received via the second interface.

On receipt of the message, the processing unit may be further arranged to cause the second interface to send an indication to the host processor that the message is available. On receipt of the message, the processing unit may be further arranged to cause a timer to start monitoring a time limit for receiving a response to the indication. The processing unit may be arranged to cause the positive acknowledgement to be transmitted following the expiry of the time limit.

The communication may be a response to the indication.

The processing unit may be arranged to have access to a list of acceptable criteria for not receiving a response to the indication prior to expiry of the time limit, the list comprising that the host processor is in a power saving mode and, following receipt of a response to the indication from the host processor following the expiry of the time limit, the processing unit is further arranged to respond to the received response with an error signal unless it is determined that at least one of the acceptable criteria is fulfilled. An acceptable criterion may be that a user of the host processor is inputting a message.

The processing unit may be arranged to receive an indication that the host processor is in a power saving mode via the second interface in an Attention (AT) Command.

The terminal may comprise a housing and the modem is an internal module within the terminal housing. The second interface may comprise a wired connector or connection within the terminal housing to connect to the host processor. The first interface may connect to a first wireless transceiver of the terminal for connecting to the network.

The modem may comprise an external unit for use at the terminal. The second interface may be a serial interface. The modem may comprise a dongle housing, the modem for plugging into the terminal via the second interface. The second interface may comprise a second wireless transceiver for connecting to the terminal via a local wireless connection.

The modem may comprise a mobile phone housing for connecting to the terminal via the second interface, the mobile phone thus being operable as a telephone and as an external wireless cellular modem for the terminal.

The message may be a short message service (SMS) message.

The disclosure also provides a system including a terminal; a network; and a modem as described herein for use at the terminal.

A portion of the above-described modems, systems or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, modems, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this disclosure relates will appreciate that other and further additions, deletions, substitutions and modifications may be made to the described embodiments and that the disclosure is not limited by the described embodiments.

The invention claimed is:

1. A modem for use at a terminal, the modem comprising:
a first interface arranged for connection to a network;
a second interface arranged for connection to a host processor on the terminal; and
a processing unit arranged to, on receipt of a message from the network addressed to the host processor:
determine whether or not the host processor is in a power saving mode;
if it is determined that the host processor is in a power saving mode, cause the first interface to transmit an acknowledgement to said message to the network regardless of whether a communication from the host processor is received via the second interface;
if it is determined that the host processor is not in a power saving mode and at least one of a plurality of acceptable criteria is fulfilled, cause the first interface to transmit the acknowledgement to the message to the network; and
if it is determined that the host processor is not in a power saving mode and at least one of the plurality of acceptable criteria is not fulfilled, cause the first interface to transmit a request for retransmission to the network.

2. The modem according to claim 1, wherein on receipt of said message, the processing unit is further arranged to cause the second interface to send an indication to the host processor that said message is available.

3. The modem according to claim 2, wherein on receipt of said message, the processing unit is further arranged to cause a timer to start monitoring a time limit for receiving a response to said indication.

4. The modem according to claim 3, wherein the processing unit is arranged to cause the acknowledgement to be transmitted following the expiry of the time limit.

5. The modem according to claim 2, wherein the communication is a response to said indication.

6. The modem according to claim 3, wherein the processing unit is arranged to have access to a list of the plurality of acceptable criteria for not receiving a response to said indication prior to expiry of the time limit, the list comprising that the host processor is in a power saving mode and, following receipt of a response to said indication from the host processor following the expiry of the time limit, the processing unit is further arranged to respond to the received response with an error signal unless it is determined that at least one of the acceptable criteria is fulfilled.

7. The modem as claimed in claim 6, wherein an acceptable criterion is that a user of the host processor is inputting a message.

8. The modem according to claim 1, wherein the processing unit is arranged to receive an indication that the host processor is in a power saving mode via the second interface in an Attention (AT) Command.

9. The modem according to claim 1, wherein the terminal comprises a housing and the modem is an internal module within said terminal housing.

10. The modem of claim 9, wherein the second interface comprises a wired connector or connection within said terminal housing to connect to the host processor.

11. The modem of claim 9, wherein the first interface connects to a first wireless transceiver of said terminal for connecting to the network.

12. The modem according to claim 1, wherein the modem comprises an external unit for use at the terminal.

13. The modem of claim 12, wherein the second interface is a serial interface.

14. The modem of claim 12, wherein the modem comprises a dongle housing, said modem for plugging into said terminal via the second interface.

15. The modem of claim 12, wherein the second interface comprises a second wireless transceiver for connecting to the terminal via a local wireless connection.

16. The modem according to claim 1, wherein the modem comprises a mobile phone housing for connecting to said terminal via the second interface, the mobile phone thus being operable as a telephone and as an external wireless cellular modem for the terminal.

17. A modem according to claim 1, wherein the message is a short message service (SMS) message.

18. A system comprising:
a terminal;
a network; and
a modem according to claim 1 for use at the terminal.

19. A computer program product for operating a modem for use at a terminal, the modem having a processing unit, a first interface arranged to connect to a network, a second interface arranged to connect to a host processor on the terminal; wherein the computer program product comprises code embodied on a non-transitory computer-readable medium and configured so as when executed on the processing unit of said modem to:

on receipt of a message from the network addressed to the host processor:
determine whether or not the host processor is in a power saving mode; and
if it is determined that the host processor is in a power saving mode, cause the first interface to transmit an acknowledgement to said message to the network regardless of whether a communication from the host processor is received via the second interface;
if it is determined that the host processor is not in a power saving mode and at least one of a plurality of acceptable criteria is fulfilled, cause the first interface to transmit the acknowledgement to the message to the network; and
if it is determined that the host processor is not in a power saving mode and at least one of the plurality of acceptable criteria is not fulfilled, cause the first interface to transmit a request for retransmission to the network.

20. A method of operating a modem at a terminal, the modem having a processing unit, a first interface arranged to connect to a network, a second interface arranged to connect to a host processor on the terminal, wherein the method comprises:
receiving a message addressed to the host processor on the first interface from the network;
determining whether or not the host processor is in a power saving mode;
if it is determined that the host processor is in a power saving mode, cause the first interface to transmit an acknowledgement to said message to the network regardless of whether a communication from the host processor is received via the second interface; and
if it is determined that the host processor is not in a power saving mode and at least one of a plurality of acceptable criteria is fulfilled, cause the first interface to transmit the acknowledgement to the message to the network.

21. The method according to claim 20, further comprising causing the first interface to transmit a request for retransmission to the network if it is determined that the host processor is not in a power saving mode and at least one of the plurality of acceptable criteria is not fulfilled.

* * * * *